| United States Patent [19] | [11] 3,947,610 |
| --- | --- |
| Bodmer et al. | [45]*Mar. 30, 1976 |

[54] PROCEDURE FOR SEALING LEAKS IN CLOSED COOLING SYSTEMS

[75] Inventors: Maurice Bodmer, Nussbaumen; Edmund Hartinger, Rutihof-Baden; Albert Huber, Moriken, all of Switzerland

[73] Assignee: BBC Brown, Boveri & Company Limited, Baden, Switzerland

[ * ] Notice: The portion of the term of this patent subsequent to Nov. 26, 1991, has been disclaimed.

[22] Filed: Aug. 7, 1974

[21] Appl. No.: 495,511

Related U.S. Application Data

[63] Continuation-in-part of Ser. No. 293,641, Sept. 26, 1972, Pat. No. 3,850,657.

[52] U.S. Cl. .................. 427/142; 21/2.7 R; 252/72; 427/437; 427/438; 106/33
[51] Int. Cl.² ..................... C09K 3/12; B32B 15/00
[58] Field of Search ............. 117/2 R, 130 E, 70 D; 252/72; 21/2.7 R; 427/437, 438, 142; 106/33 X

[56] References Cited

UNITED STATES PATENTS

| 3,532,519 | 10/1970 | Hirohata et al. ................. 117/130 E |
| 3,709,712 | 1/1973 | Rossman ............................. 117/2 R |
| 3,850,657 | 9/1972 | Bodmer et al. ..................... 427/142 |

*Primary Examiner*—Ralph S. Kendall
*Assistant Examiner*—Edith R. Buffalow
*Attorney, Agent, or Firm*—Oblon, Fisher, Spivak, McClelland & Maier

[57] ABSTRACT

Leaks in closed cooling systems containing an aqueous medium as the coolant, are sealed by electroless deposition of a metal or metal containing compound from a water soluble, easily reducible metal compound. A complexing agent may be added to the coolant to assist in solubilizing the easily reducible metal compound. In one embodiment, the reducible metal compound is formed in situ by attacking the conduit walls of the cooling system so as to form solubilized compounds, or compounds which can be solubilized by addition of suitable complexing agents.

13 Claims, No Drawings

3,947,610

PROCEDURE FOR SEALING LEAKS IN CLOSED COOLING SYSTEMS

CROSS-REFERENCE TO RELATED APPLICATIONS

This is a continuation-in-part of application Ser. No. 293,641 filed Sept. 26, 1972, now U.S. Pat. No. 3,850,657.

BACKGROUND OF THE INVENTION

1. Field of the Invention

This invention relates to a method for sealing leaks in a closed cooling system containing an aqueous medium as the coolant.

2. Description of the Prior Art

The known sealants for sealing leaks in closed cooling systems, such as automobile radiators, generally consist of a suspension of organic or inorganic substances. These sealants are added to the cooling water so that as the water escapes through the leak, the suspended matter gradually accumulates around the leak until it becomes completely closed off. The disadvantage of such substances, however, is that high concentrations of suspended matter are required to effect good leak sealing properties. As the concentration is increased, however, the damages of causing blockages in small cross-sectional area conduits in the cooling system increases.

Accordingly, a need continues to exist for a technique of sealing leaks in closed cooling systems, which does not depend upon the presence of large concentrations of suspended matter, with its consequent risk of causing blockages in desired passages within the system.

SUMMARY OF THE INVENTION

Accordingly, it is one object of this invention to provide a novel sealant technique which can be used in closed cooling systems.

It is another object of this invention to provide a novel sealing technique which does not depend upon the presence of high concentrations of suspended matter to effect sealing.

A further object of this invention is to provide a technique for sealing leaks in closed cooling systems without a consequent increase in the risk of blocking small cross-sectional area conduits within the system.

These and other objects of this invention, as will hereinafter become more readily apparent from the following description, have been attained by sealing leaks in cooling systems which use an aqueous medium as the coolant, by use of an electroless deposition of a metal or a metal containing compound from a water soluble, easily reducible metal compound. A complexing agent may be added to the coolant to enhance solubilization of the reducible metal compound.

In one embodiment, the walls of the cooling system are formed from a metal which can be attacked to form a solubilized compound in situ or a compound which can be solubilized by addition of a suitable complexing agent.

DESCRIPTION OF THE PREFERRED EMBODIMENTS

According to the present invention an easily reducible metal compound is added to the aqueous media of the cooling system. The metal compound selected may be one that can be reduced to the metallic state, or one which may be reduced to form another metallic compound wherein the metal is in a lower valence state. It is only essential that the product of the reduction reaction be relatively insoluble in water. A wide variety of different metal compounds can be used for this purpose, and the particular selection will depend upon the particular use requirements.

Suitable metals forming the compounds, include Cu, Bi, Cr, Fe, Mn, Mg, Zn, Al, Sb, Ca, Ba, Sr, Hg, Ag, Au, Sn, Ni, Cd, Pb, Co, Pt, Rh, Ir, Pd and the like. Preferred are Cu, Ag, Au, Sn, Ni and Cd compounds. These metals may be formed from a wide variety of different reducible compounds. Such compounds include the hydroxides or oxides of inorganic or organic salts; particularly the sulfates, the halides, such as bromides, iodides or chlorides; the nitrates; acetates; oxides; cyanides; oxalates; or the like.

For instance, particularly suitable metal compounds include copper sulfate, silver sulfate, gold sulfate, tin sulfate, nickel sulfate, cadmium sulfate, silver chloride, gold chloride, tin chloride, nickel chloride, cadmium chloride, copper chloride, copper nitrate, silver nitrate, gold nitrate, nickel nitrate, cadmium nitrate, copper acetate, silver acetate, tin acetate, nickel acetate, cadmium acetate, copper oxide, silver oxide, gold oxide, tin oxide, nickel oxide, cadmium oxide or the like.

In some instances, the metal compound is not water soluble and it is necessary to solubilize the compound by reaction with a complexing ammonia, hydrazine, ethylene diamine, tetracetic acid, hydrocyanic acid citric acid, tartaric acid, or an alkali salt of said acids. Further suitable complexing agents are nitrilotriacetic acid (MTA), triethylamine, 1,2-diaminocyclohexane tetraacidicacid, ethylene diamine, diethylenetriamine, triethylenetetramine, S-methylmercaptoacidicacid, N,N-diethylthiocarbamaicacid, $\beta,\beta',\beta''$-triaminotriethylamine.

Complex formation is facilitated by maintaining the pH of the aqueous media in an alkaline condition. While pH values of greater than 7 are suitable for this purpose, best results are attained at pH values of 9–10. If the complexing agent does not sufficiently alkalize the water, an alkali such as NaOH, $NaCO_3$, KOH, $KCO_3$, $NaCHCO_3$, $NH_4OH$, an organic amine, or the like may be added for pH adjustment.

By this means, such ordinarily insoluble metal compounds, as silver or gold chloride, nitrate, or oxide, or tin oxide, can be solubilized and used in the reduction reaction.

The quantity of complexing agents required to effect solubilization will, of course, depend upon the particular metal compound being complexed and the particular complexing agent. In general however, a good rule of thumb is to use $10^{-6}$ to 1 mole of the complexing agent.

In some instances the electroless precipitation is not of the metal in its zero valence state, but of a metal compound wherein the metal is in a lower valence state than in the starting reducible compound. For instance, higher valence state salts of copper, iron, nickel, tin, cobalt, gold, lead, chromium, or the like, and in particular the oxides of these metals, may be reduced to insoluble lower valence state compounds.

The hydroxides, oxides or organic or inorganic metal salts may be added to the coolant system, or may be formed in situ by attacking the metal walls of the cooling system conduits. For instance, metal oxides can be formed by introducing air or another oxidizing agent such as hydrogen peroxide into the cooling system having copper or tin walls so as to form soluble corrosion products such as copper oxides or tin oxides or hydroxides. Alternatively, sulfates or chlorides can be formed by introduction of hydrochloric acid or sulfuric acid. These soluble oxides than can be precipitated to either their free metal form, or to their lower valence state form by electroless deposition initiated with an appropriate reducing agent.

In carrying out this invention, the quantity of the soluble cation introduced through the reducible compound is preferably from $10^{-8}$ to 1 molar with especially good results being attained when the quantity of reducible cations is between $10^{-7}$ to $10^{-3}$ moles. This concentration can be attained either in situ as above described, or by introduction through a suitable inlet means such as a dosing pump.

When the soluble reducible metal compound is formed in situ such as by forming corrosion products, in a clean cooling system, i.e., one not already containing significant corrosion products in the coolant, the quantity of corrosion products in the coolant can be easily controlled by the quantity of $O_2$ or other corrosive agent introduced into the system. When the coolant already contains significant quantities of corrosion products by its normal operation, it is only necessary to add the reducing agent with the optional complexing agent.

In copper tubing systems, good results are attained when copper corrosion products are found in situ using 0.001 to 0.2 ppm $O_2$ to form 0.01 to 0.2 ppm copper compound. Solubilization of the often insoluble copper compounds is attained by introduction of a complexing agent such as hydrazine.

The quantity of reducing agent required, of course, will depend upon the stoichiometry of the system and the degree of reduction required, whether to the free metal state, or to some intermediate state. In general, therefore, the quantity of reducing agent will be from $10^{-6}$ to 1 molar.

The techniques of this invention, of course, requires that the metal compound be selected such that it is not autogeneously reduced to a precipitate form by the conduit walls of the cooling system. That is to say that certain metals which are commonly used as structural materials in forming cooling tubes, can have a reducing activity on certain soluble metal compounds. Such metals include aluminum, zinc or low-alloy steels. By use of conventional knowledge in the art, namely an EMF table, one can rapidly determine which metal compounds would not be appropriate for use when using cooling systems which have been constructed from such metals.

While it is not completely understood, it is theorized that the electroless precipitation technique of this invention acts to cause the build-up of a precipitate in the vicinity of the leak as the aqueous medium is discharged through the opening or split in the system. The build-up of precipitate proceeds to the point in which the leak becomes completely blocked.

As above-described, the reducible metal compound can be added to the aqueous media either in situ or by addition through a dosing pump, or other suitable metering device. The reducing agent, together with the optional complexing agent, may be added simultaneously and with the reducible metal compound, if such a metal compound is introduced from external sources. If the coolant is escaping from the system, it may be necessary to introduce additional amounts of the reducing agent and/or the reducible metal compound, and/or the complexing agent, if one is used. It has been found that usually it is necessary to add repeated amounts of reducing agent, whereas additional amounts of complexing agent does not seem to be frequently needed.

Having generally described the invention, a more complete understanding can be obtained by reference to the following example which is included for purposes of illustration only and is not intended to be limited unless otherwise specified.

EXAMPLE

A leak in a water cooled generator rotor having a closed copper tubing cooling system which was losing cooling water at a rate of 40 liters/hour under a pressure of 80–100 bar, was sealed by adjusting the copper cation content of the water to approximately 0.2 ppm using an $O_2$ content of about 0.2 ppm. The pH of the water was increased to between 9 and 10 and morpholine added until the concentration of complexing agent was $10^{-4}$ molar hydrazine sold commercially under the name Levoxin, Bayer Leverkusen, was introduced into the system as the reducing agent until the level present in the coolant was $10^{-3}$ molar.

The loss of water decreased with time finally stabilizing at about 0.1 liter/hour. The copper cation concentration fell to 0.01 to 0.02 ppm during the same period.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A method for sealing leaks in a closed cooling system which contains an aqueous medium as the coolant, which comprises:
    introducing into the coolant a water-soluble, reducible metal hydroxide, inorganic salt, organic salt, or a complex thereof, of a metal selected from the group consisting of Cu, Bi, Cr, Fe, Mn, Mg, Zn, Al, Sb, Ca, Ba, Sr, Hg, Ag, Au, Sn, Ni, Cd, Pb, Co, Pt, Rh, Ir, and Pd, or a water-soluble, reducible metal oxide of a metal selected from the group consisting of:
    Bi, Cr, Fe, Mn, Mg, Zn, Al, Sb, Ca, Ba, Sr, and Hg, wherein the concentration of said soluble metal cation ranges from $10^{-8}$ to 1 molar; and
    introducing a reducing agent into said coolant in a concentration between $10^{-6}$ and 1 molar, so as to cause electroless deposition of the metal or a corresponding metal compound wherein the metal is present in a lower valence state, whereby leaks in the closed cooling system are sealed.

2. The method of claim 1, wherein said reducible compound is produced in situ by corrosive action of the cooling water on the cooling pipes.

3. The method of claim 2, wherein the corrosive products are induced by the addition of air into the coolant.

4. The method of claim 1, wherein said deposition is of a metal in the zero valence state.

5. The method of claim 1, wherein said deposition is of a metal compound, wherein the metal is in a lower valence state than said reducible compound.

6. The method of claim 1, wherein said reducible metal is in the form of a complex with a complexing agent in order to enhance the solubility of said compound.

7. A method of claim 1, wherein said metal hydroxide, inorganic salt, organic salt, or metal complex is comprised of a metal selected from the group consisting of Cu, Ag, Au, Sn, Ni, Cd, Pb, Co, Pt, Rh, Ir and Pd.

8. The method of claim 7, wherein said metal compound is copper oxide.

9. The method of claim 8, wherein said copper oxide is formed in situ as a corrosion product of the copper walls of the conduits of said closed cooling system.

10. The method of claim 9, wherein said corrosion products are enhanced by the addition of an oxidizing agent into the coolant.

11. The method of claim 10, wherein said oxidizing agent is oxygen.

12. The method of claim 6, wherein said complexing agent is morpholine.

13. The method of claim 1, wherein the pH of the aqueous medium is adjusted to between 7 and 10.

* * * * *